US00RE46131E

(19) United States
(12) Reissued Patent
Carbo et al.

(10) Patent Number: US RE46,131 E
(45) Date of Reissued Patent: Aug. 30, 2016

(54) ACOUSTICAL TILE

(71) Applicants: Adelaida Carbo, Barrington, IL (US); Gary Hacker, Roscoe, IL (US); Charles Byers, Naperville, IL (US); Scott Daryl Cimaglio, Third Lake, IL (US)

(72) Inventors: Adelaida Carbo, Barrington, IL (US); Gary Hacker, Roscoe, IL (US); Charles Byers, Naperville, IL (US); Scott Daryl Cimaglio, Third Lake, IL (US)

(73) Assignee: USG INTERIORS, LLC, Chicago, IL (US)

(21) Appl. No.: 14/539,007

(22) Filed: Nov. 12, 2014

Related U.S. Patent Documents

Reissue of:
(64) Patent No.: 8,309,231
Issued: Nov. 13, 2012
Appl. No.: 11/747,141
Filed: May 10, 2007

U.S. Applications:
(60) Provisional application No. 60/809,757, filed on May 31, 2006.

(51) Int. Cl.

| | |
|---|---|
| ***B32B 27/08*** | (2006.01) |
| ***D21H 19/82*** | (2006.01) |
| ***B32B 29/00*** | (2006.01) |
| ***D21H 19/10*** | (2006.01) |
| ***E04B 1/86*** | (2006.01) |
| ***E04B 9/00*** | (2006.01) |
| ***E04B 9/04*** | (2006.01) |
| *E04B 1/84* | (2006.01) |
| *E04B 1/76* | (2006.01) |
| *D21H 21/36* | (2006.01) |

(52) U.S. Cl.
CPC ..... *D21H 19/82* (2013.01); *B32B 29/00* (2013.01); *D21H 19/10* (2013.01); *E04B 1/86* (2013.01); *E04B 9/001* (2013.01); *E04B 9/045* (2013.01); *D21H 21/36* (2013.01); *E04B 2001/7691* (2013.01); *E04B 2001/8461* (2013.01); *Y10T 428/256* (2015.01); *Y10T 428/2982* (2015.01); *Y10T 428/31964* (2015.04)

(58) Field of Classification Search
None
See application file for complete search history.

(56) References Cited

U.S. PATENT DOCUMENTS

| | | | | |
|---|---|---|---|---|
| 1,769,519 A | | 7/1930 | King et al. | |
| 3,246,063 A | | 4/1966 | Podgurski | |
| 3,307,651 A | | 3/1967 | Podgurski | |
| 4,010,817 A | * | 3/1977 | Warren | E04C 2/243 162/159 |

(Continued)

FOREIGN PATENT DOCUMENTS

| | | |
|---|---|---|
| EP | 0583086 A1 | 2/1994 |
| EP | 0990729 A1 | 4/2000 |

(Continued)

OTHER PUBLICATIONS

Indoor Air Quality Section et al., "Standard Practice for the Testing of Volatile Organic Emissions from Various Sources Using Small-Scale Environmental Chambers", Jul. 15, 2004.

(Continued)

*Primary Examiner* — Ling Xu
(74) *Attorney, Agent, or Firm* — Pearne & Gordon LLP

(57) ABSTRACT

The present invention relates to an acoustical tile that includes a core and a surface treatment. The surface treatment comprises a formaldehyde-free latex binder, the binder including at least one formaldehyde-free biocide. The present invention also provides a process of manufacturing an acoustical tile.

11 Claims, 1 Drawing Sheet

(56) References Cited

U.S. PATENT DOCUMENTS

| | | | | |
|---|---|---|---|---|
| 4,016,234 | A * | 4/1977 | Warren et al. | 264/129 |
| 4,449,978 | A | 5/1984 | Iacoviello | |
| 4,489,192 | A | 12/1984 | Shih et al. | |
| 4,861,822 | A | 8/1989 | Keskey et al. | |
| 4,863,979 | A | 9/1989 | Beyersdorf et al. | |
| 4,911,788 | A | 3/1990 | Pittman et al. | |
| 4,963,603 | A | 10/1990 | Felegi, Jr. et al. | |
| 5,013,598 | A | 5/1991 | Guerro et al. | |
| 5,047,463 | A | 9/1991 | Keskey et al. | |
| RE33,773 | E | 12/1991 | Guerro et al. | |
| 5,134,179 | A | 7/1992 | Felegi, Jr. et al. | |
| 5,143,954 | A | 9/1992 | Hutton et al. | |
| 5,250,153 | A * | 10/1993 | Izard et al. | 162/152 |
| 5,264,475 | A * | 11/1993 | Kissel | 524/211 |
| 5,354,803 | A | 10/1994 | Dragner et al. | |
| 5,362,798 | A | 11/1994 | Hayes | |
| 5,383,756 | A | 1/1995 | Coleman et al. | |
| 5,385,756 | A | 1/1995 | Lofton | |
| 5,427,587 | A | 6/1995 | Arkens et al. | |
| 5,494,963 | A | 2/1996 | Hayes | |
| 5,556,527 | A | 9/1996 | Igarashi et al. | |
| 5,661,213 | A | 8/1997 | Arkens et al. | |
| 5,874,476 | A | 2/1999 | Hsu et al. | |
| 5,886,306 | A | 3/1999 | Patel et al. | |
| 6,071,994 | A | 6/2000 | Hummerich et al. | |
| 6,099,773 | A | 8/2000 | Reck et al. | |
| 6,114,464 | A | 9/2000 | Reck et al. | |
| 6,136,916 | A | 10/2000 | Arkens et al. | |
| 6,146,746 | A | 11/2000 | Reck et al. | |
| 6,191,244 | B1 | 2/2001 | Lau et al. | |
| 6,225,242 | B1 | 5/2001 | Lau et al. | |
| 6,299,936 | B1 | 10/2001 | Reck et al. | |
| 6,300,409 | B2 | 10/2001 | Lau et al. | |
| 6,316,119 | B1 | 11/2001 | Metzger et al. | |
| 6,361,788 | B1 * | 3/2002 | Antoni-Zimmermann et al. | 424/406 |
| 6,443,258 | B1 | 9/2002 | Putt et al. | |
| 6,481,171 | B2 | 11/2002 | Yu et al. | |
| 6,585,989 | B2 | 7/2003 | Herbst et al. | |
| 6,897,191 | B2 | 5/2005 | Batdorf | |
| 6,906,132 | B2 | 6/2005 | Belmares et al. | |
| 6,919,132 | B2 | 7/2005 | Felegi, Jr. et al. | |
| 7,199,179 | B2 | 4/2007 | Clamen et al. | |
| 7,303,766 | B2 | 12/2007 | Withiam et al. | |
| 7,364,015 | B2 | 4/2008 | Englert et al. | |
| 7,399,818 | B2 | 7/2008 | Bromm et al. | |
| 7,405,169 | B2 | 7/2008 | Lu | |
| 2003/0236043 | A1 | 12/2003 | Calzavara et al. | |
| 2004/0039098 | A1 | 2/2004 | Belmares et al. | |
| 2004/0048531 | A1 | 3/2004 | Belmares et al. | |
| 2004/0082240 | A1 | 4/2004 | Rodrigues | |
| 2004/0082241 | A1 | 4/2004 | Rodrigues | |
| 2004/0082726 | A1 | 4/2004 | Rodrigues et al. | |
| 2004/0102501 | A1 | 5/2004 | Lutz et al. | |
| 2004/0175407 | A1 | 9/2004 | McDaniel | |
| 2004/0198785 | A1 * | 10/2004 | Heer et al. | 514/372 |
| 2004/0209071 | A1 * | 10/2004 | Carbo et al. | 428/328 |
| 2005/0058689 | A1 | 3/2005 | McDaniel | |
| 2005/0112374 | A1 | 5/2005 | Jaffee et al. | |
| 2005/0112978 | A1 | 5/2005 | Jaffee et al. | |
| 2005/0209410 | A1 | 9/2005 | Bromm et al. | |
| 2005/0214534 | A1 | 9/2005 | Adamo et al. | |
| 2006/0035097 | A1 | 2/2006 | Batdorf | |
| 2006/0121810 | A1 | 6/2006 | Rodrigues | |
| 2006/0199742 | A1 * | 9/2006 | Arisz et al. | 507/114 |
| 2007/0004835 | A1 | 1/2007 | Finch et al. | |
| 2007/0004850 | A1 | 1/2007 | Finch et al. | |
| 2007/0004887 | A1 | 1/2007 | Finch et al. | |
| 2007/0006390 | A1 | 1/2007 | Clamen et al. | |
| 2007/0010651 | A1 | 1/2007 | Finch et al. | |
| 2007/0055012 | A1 | 3/2007 | Caldwell | |
| 2007/0082571 | A1 | 4/2007 | Lu | |
| 2007/0264895 | A1 | 11/2007 | Jaffee et al. | |
| 2007/0277948 | A1 | 12/2007 | Carbo et al. | |
| 2007/0282065 | A1 | 12/2007 | Weinstein | |
| 2008/0009209 | A1 | 1/2008 | Clamen et al. | |
| 2008/0152816 | A1 | 6/2008 | Clamen et al. | |
| 2008/0152817 | A1 | 6/2008 | Kelly | |
| 2008/0153946 | A1 | 6/2008 | Kelly | |
| 2008/0154013 | A1 | 6/2008 | Clamen et al. | |

FOREIGN PATENT DOCUMENTS

| | | | |
|---|---|---|---|
| EP | 1391443 | A2 | 2/2004 |
| EP | 1935933 | A1 | 6/2008 |
| EP | 2085365 | a1 | 8/2009 |
| JP | 06-184285 | | 7/1994 |
| JP | 2000-511572 | | 9/2000 |
| JP | 2004-83909 | | 3/2004 |
| WO | WO2004026918 | A1 | 4/2004 |

OTHER PUBLICATIONS

English Abstract of JP H6-184285; Applicant: Rohm & Haas Co; Published: May 7, 1994.

* cited by examiner

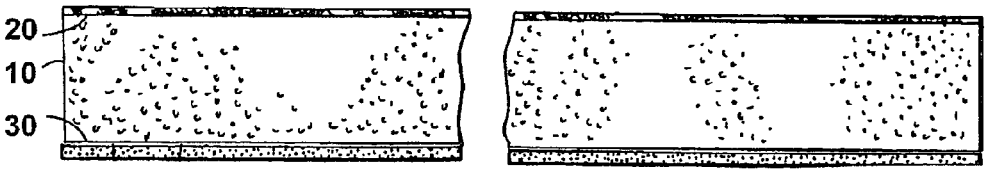
20
10
30

ACOUSTICAL TILE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Acoustical tiles are specially designed systems that are intended to improve acoustics by absorbing sound or reducing sound transmission in an indoor space, such as a room, hallway or conference hall, or the like. Although there are numerous types of acoustical tiles, a common variety of acoustical tile is generally composed of mineral wool fibers, fillers, colorants and a binder, as disclosed, for example, in U.S. Pat. No. 1,769,519. These materials, in addition to a variety of others, can be employed to provide acoustical tiles with desirable acoustical properties and other properties, such as color and appearance.

Although, as discussed above, there are a variety of commercially available acoustical tile products, there are currently no formaldehyde-free acoustical ceiling products comprised of mineral wool fiber on the market today. A number of products classified as low volatile organic chemical (VOC) emitters are available, however, all of these products emit detectable levels of formaldehyde due to the presence of various formaldehyde emitting components that are employed in these tiles. The inventors have found that certain polymeric binders used in surface treatments and back coatings inherently contain, release, emit or generate formaldehyde. In addition, additives such as wet-state preservatives or biocides included in the surface treatments and back coatings can also release, emit or generate detectable and quantifiable levels of formaldehyde. Thus, even though formaldehyde may not be a component of a polymeric binder or a biocide as used in acoustical tile, the tile may still release, emit or generate formaldehyde for a number of reasons, including, for example, degradation of the polymeric binder and/or biocide. Although formaldehyde emissions that are generated during heat exposure in the manufacturing process may be exhausted into the stacks or thermal oxidizers, the resulting product will still contain residual formaldehyde, which is emitted upon installation. A reduction in formaldehyde emissions, or elimination of such emissions, will provide improved indoor air quality in those locations where acoustical tiles are installed, such as schools, healthcare facilities, or office buildings.

This invention provides an acoustical tile and a process of manufacturing an acoustical tile. These and other advantages of the present invention will be apparent to those skilled in the art in view of the detailed description of this invention.

BRIEF SUMMARY OF THE INVENTION

The present invention provides an acoustical tile that includes a core and a surface treatment. Still further, the present invention provides a formaldehyde-free acoustical tile that includes a core and a surface treatment. The surface treatment includes a formaldehyde-free latex binder and comprises at least one formaldehyde-free biocide.

Further, the present invention provides an acoustical tile and, still further, a formaldehyde-free acoustical tile, each comprising a core and a surface treatment, wherein the surface treatment prior to drying comprises: from about 30 to about 50 weight % water; from about 40 to about 60 weight % filler; from about 2 to about 15 weight % $TiO_2$; from about 2 to about 20 weight % formaldehyde-free latex; from about 0.25 to about 1.00 weight % dispersant; from about 0.01 to about 1.00 weight % thickener; from about 0.10 to about 1.00 weight % surfactant; from about 0.05 to about 0.50 weight % defoamer; and from about 0.01 to about 1.50 weight % formaldehyde-free biocide.

Moreover, the present invention provides a process for manufacturing an acoustical tile and, still further a formaldehyde-free acoustical tile. This process comprises preparing an acoustical tile core and applying a surface treatment to the core, wherein the surface treatment includes a formaldehyde-free latex binder and comprises at least one formaldehyde-free biocide.

Furthermore, the present invention provides a surface treatment. The present invention also provides an acoustical tile treated with a surface treatment with no added formaldehyde or components that release, emit or generate quantifiable amounts of formaldehyde. Still further, the present invention provides a formaldehyde-free acoustical tile treated with a surface treatment with no added formaldehyde or components that release, emit or generate quantifiable amounts of formaldehyde.

BRIEF DESCRIPTION OF THE DRAWING

FIG. 1 is a schematic representation of a formaldehyde-free acoustical tile, in accordance with one aspect of the present invention.

DETAILED DESCRIPTION OF THE INVENTION

The present invention comprises an acoustical tile. In accordance with another aspect, the present invention also comprises a formaldehyde-free acoustical tile.

As used herein, the term "formaldehyde-free acoustical tile" refers to a tile that, as manufactured, releases or emits formaldehyde at a level that is below the quantifiable limits, that is, lower limit of quantitation (lower LOQ), as established by the testing protocols of the Standard Practice For The Testing Of Volatile Organic Emissions From Various Sources Using Small-Scale Environmental Champers, dated Jul. 15, 2004 (the Standard Practice), which incorporates a number of American Society for Testing and Materials (ASTM) standards, including ASTM D 5116-97. Section 3.9.7.1 of the Standard Practice defines the lower LOQ "as the analyte mass that produces a response that is 10 times higher than the instrumental noise level or is 10 times the standard deviation for repeated analyses of a low level standard." The term formaldehyde-free means that the amount of formaldehyde released or emitted is at below about the lower LOQ. In a preferred embodiment, the amount of formaldehyde released or emitted by the formaldehyde-free acoustical tile of the present invention is typically at below about 2 $\mu g/m^3$. In a more preferred embodiment, the amount of formaldehyde released or emitted by the formaldehyde-free acoustical tile of the present invention is typically at below about 1 $\mu g/m^3$. Although acoustical tiles in accordance with the present invention are, as manufactured, formaldehyde-free as defined herein, the acoustical tiles preferably are stored in a location and in a manner that will avoid exposure to VOC contaminants (specifically formaldehyde) that could be absorbed by formaldehyde-free acoustical tiles.

Formaldehyde-free acoustical tiles in accordance with the preferred embodiment of the present invention are desirable for a number of reasons, especially because of the adverse health and environmental consequences associated with VOC emitters, particularly formaldehyde. For example, formaldehyde has been classified by the International Agency for Research on Cancer, part of the World Health Organization, as a human carcinogen. Legislative and regulatory bodies are increasingly requiring lower emission levels for formaldehyde. For example, California's Special Environmental Requirements, Specifications Section 01350, in the Collaborative For High-Performance Schools (CHPS), includes emissions-testing procedures and maximum allowable concentrations for selected VOCs, and is the first health-based building material specification. A subsection of the CHPS Section 01350 focuses on the selection and handling of building materials with the goal of minimizing the adverse impact of building materials on indoor air quality and occupant health, based on small chamber tests per the ASTM D 5116-97 standard method. In 2004 CHPS was adopted the Standard Practice.

The Standard Practice also specifies procedures for specimen receiving, handling, and preparation. As specified in the Standard Practice, each test specimen is conditioned for 10 days±5 hours at 23±2° C. and 50±10% relative humidity, followed by a 96-hour test. The test method requires chamber air sampling at 24, 48, and 96 hour periods after initiating the chamber test, following completion of the conditioning period, based on small chamber tests as per the Standard Practice. Instrument calibration and identification and quantification of individual compounds are required.

A formaldehyde-free acoustical tile in accordance with one aspect of the present invention, as illustrated schematically in FIG. 1, comprises an acoustical tile core 10, a surface treatment 20, and optionally a backing 30. An illustrative procedure for producing acoustical tile is described in U.S. Pat. No. 1,769,519. In one aspect, the core 10 comprises a mineral wool fiber and a starch, wherein the mineral wool fiber can include a variety of fibers, such as slag wool, rock wool and/or basalt wool. In another aspect of the present invention, the starch component of the formaldehyde-free acoustical tiles can be a starch gel, which acts as a binder for the mineral wool fiber, as is disclosed in U.S. Pat. Nos. 1,769,519, 3,246,063, and 3,307,651. In a further aspect of the present invention, the acoustical tile core 10 can comprise a glass fiber.

The acoustical tile of the present invention can be prepared using a variety of techniques. In one embodiment, the core 10 is prepared by a wet- or water-felted process, as is described in U.S. Pat. Nos. 4,911,788 and 6,919,132. The surface treatment 20 and backing 30, as described herein, can also be applied to an acoustical tile prepared by way of a wet-felted process. Those of skill in the art will know how to modify the surface treatment 20 and the backing 30 for application to a wet-felted core 10. In a preferred embodiment, the core 10 is prepared by combining and mixing starch and a variety of additives in water to provide a slurry. The slurry is heated to cook the starch and create the starch gel, which is then mixed with mineral wool fiber. This combination of gel, additives, and mineral wool fiber (referred to as "pulp") is metered into trays in a continuous process. The bottom of the trays into which the pulp is metered can optionally contain a backing 30 (for example, a bleached paper, unbleached paper, or kraft paper-backed aluminum foil, hereinafter referred to as kraft/aluminum foil), which serves to aid in the release of the material from the tray, but also remains as part of the finished product. The surface of the pulp can be patterned, and the trays containing the pulp can be subsequently dried, for example, by transporting them through a convection tunnel dryer. Next, the dried product or slab can be fed into a finishing line, where it may be cut to size to provide the acoustic tile core 10. The core 10 can then be converted to the formaldehyde-free acoustical tile of the present invention by application of a surface treatment composition, which, after drying, provides the surface treatment 20 of the present invention. The surface treatment composition is preferably applied to the core 10 after the core has been formed and dried.

As mentioned above, the core 10 of the formaldehyde-free acoustical tile can also include a variety of other additives and agents. For example, the core 10 can include a calcium sulfate material (such as, stucco, gypsum and/or anhydrite), boric acid and sodium hexametaphosphate (SHMP). Kaolin clay and guar gum may be substituted for stucco and boric acid when manufacturing acoustical tile. In a further embodiment, the core 10 can include, as a preservative, one or more formaldehyde-free biocides, as described herein.

As previously discussed, acoustic tile in accordance with the present invention can optionally include the backing 30. Numerous materials can be employed as the backing 30, including unbleached paper, bleached paper, kraft/aluminum foil, and the like. A flame resistant back coating optionally can be applied in combination with bleached or unbleached paper backing to improve the products surface burning characteristics. The flame resistant back coating can include a variety of components, such as, for example, water, a flame retardant, and a biocide. The backing 30 may also be employed for improving sag resistance and/or sound control. In addition, a fill coating or a plurality of fill coatings may also be applied to the backing 30. The fill coating can include a variety of components, such as, for example, water, fillers, binders, and various other additives, such as defoamers, biocides, and dispersants.

The surface treatment 20 includes a formaldehyde-free latex, made from natural or synthetic polymers, and one or more formaldehyde-free biocides. The formaldehyde-free latex, which provides the surface treatment 20 with film strength, includes a biocide that is not a formaldehyde emitter. As used herein, the term "formaldehyde-free latex" refers to a latex that is manufactured without the use of formaldehyde, or without the use of materials capable of generating or emitting formaldehyde, or both. In keeping with the invention, only formaldehyde-free biocides are included in the formaldehyde-free latex and thus the formaldehyde-free latex does not emit or generate formaldehyde, either as a by-product of drying or as a result of the biocide included therein. Suitable materials for use in making formaldehyde-free latexes include, for example: thermoplastic synthetic acrylic polymers, available as EI 8764 (Rohm & Haas); vinyl acrylic co-polymer, available as HP 31-316 NF; terpolymers of ethylene, vinyl chloride, and vinyl acetate; homopolymers of polyvinyl acetate, available as PD 0062 (H.B. Fuller); copolymers of vinyl acetate and acrylic, available as Polyco® 3103 (Rohm & Haas); copolymers of styrene and acrylic, available as DL 218NA (Dow Chemical) and Acronal® 296D (BASF); epoxy polymer emulsions, available as Epi-Rez® 3510-W60 (Celanese); polyurethanes; and polyvinyl alcohol, available as Airvol® (Air Products); or combinations thereof. Other suitable materials *or thickeners* for use in making formaldehyde-free latexes include water-soluble polymers, such as cellulose ethers. Suitable cellulose ethers include: methyl cellulose, available as Methocel™ A (Dow Chemical) and Culminal® (Hercules, Inc.); methylhydroxyethylcellulose, available as Tylose® MH300 (Shin Etsu); methylhydroxypropylcellulose, available as Methocel™ 228 (Dow Chemical); hydroxypropylcellulose, available as Klucel® (Hercules, Inc.); sodium carboxymethylcellulose, available as Tylose® C (Shin Etsu), CMC 7H (Hercules, Inc.), and Cellosize™ CMC P-75-M (Dow Chemical); and hydroxyethylcellulose, available as Natrosol® 250 HBR (Hercules, Inc.), Cellosize™ WP-09 (Dow Chemical). Other suitable water soluble natural polymers suitable for use include pregelatinized starches, available as Calbond™ (MGP Ingredients, Inc.), and soy-protein derived polymers, available as ProCote® 550 and ProCote® 4200 (DuPont Soy Polymers). As those skilled in the art will appreciate, the formaldehyde-free latex can comprise one or more formaldehyde-free latexes. Further, in keeping with the present invention and in an effort to further reduce the emission of formaldehyde from acoustical tile of the present invention, the formaldehyde-free latex as made or supplied does not include a biocide that emits or generates formaldehyde.

The surface treatment composition and backing 30 can both be applied using a variety of techniques readily known to and available to those skilled in the art, including, for example, airless spraying systems, air assisted spraying systems, and the like. The surface treatment composition and backing 30 can also be applied by flow coating, flood coating or with roll coaters. Drying the resulting product removes any water and/or solvent used as a carrier for the surface treatment composition or any of the components thereof and converts the polymer binder into a structural, rigid network to provide surface treatment 20.

In keeping with the invention and in an effort to further reduce the emission of formaldehyde from acoustical tile of the present invention, the surface treatment includes, as a preservative, one or more biocides, none of which emits or generates formaldehyde. Preferably, formaldehyde-free biocide is added to the latex before the latex is applied to the core as a component of the surface treatment. For example, the formaldehyde-free biocide can be added to the latex during or even after the latex manufacturing process. The formaldehyde-free biocide can serve as a preservative for the latex during transport and/or storage prior to its use as a component of the surface treatment. The formaldehyde-free biocide can serve as a preservative for the acoustical tile of the present invention.

Biocides serve to eliminate or inhibit an assortment of living organisms, including mold/mildew, fungi, yeast, algae, and bacteria. Thus, for example, biocides can include antimicrobial agents, anti-fungal agents, anti-bacterial agents, and the like. Suitable formaldehyde-free biocides include isothiazolin-3-ones, having the core structure:

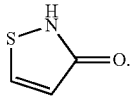

Preferred isothiazolin-3-ones include, for example, 1,2-benzisothiazolin-3-one, available as Proxel® GXL or Proxel® CRL (ARCH Chemicals), Nalcon® (Nalco), Canguard™ BIT (Dow Chemical), and Rocima™ BT 1S (Rohm & Haas). Other isothiazolin-3-ones include blends of 1,2-Benzisothiazolin-3-one and 2-methyl-4-isothiazolin-3-one, available as Acticide® MBS (Acti-Chem). Additional isothiazolin-3-ones include 5-chloro-2-methyl-4-isothiazolin-3-one, 2-methyl-4-isothiazoline-3-one, and blends thereof. Blends of 5-chloro-2-methyl-4-isothiazolin-3-one and 2-methyl-4-isothiazoline-3-one are available as Kathon™ LX (Rohm & Haas), Mergal® K14 (Troy Chemical), and Amerstat® 251 (Drew Chemical).

Another suitable formaldehyde-free biocide includes zinc 1-hydroxy-2(1H)-pyridinethione, available as Zinc Omadine® (ARCH Chemicals), and is preferably effective in both the dry state and the wet state. Zinc 1-hydroxy-2(1H)-pyridinethione can also be employed with zinc oxide, available as Zinc Omadine® emulsion. Other suitable formaldehyde-free biocides include 2-n-octyl-4-isothiazolin-3-one, available as Kathon™ 893 and Skane® M-8 (Rohm & Haas), and 2-(4-thiazolyl)-benzimidazole, available as Metasol® TK-100 (LanXess).

The biocides can be used individually, or in combination so long as neither the individual biocide, nor the combination of biocides employed emits or generates formaldehyde. Similarly, the amount of biocide included in the latex, in the surface treatment, and as combined in the latex and in the surface treatment is not limited, so long as the biocides do not emit or generate formaldehyde. It will be appreciated that if the latex is not manufactured to include a biocide, one or more biocides can be added to the latex binder before it is applied to the core, or before it is included in the surface treatment. Importantly, any such biocide or combination of biocides is selected such that the biocide or biocides do not release, emit, or generate formaldehyde as the latex is used or after drying.

The surface treatment 20 typically includes components in addition to the formaldehyde-free latex binder and the formaldehyde-free biocide. For example, before the surface treatment composition is dried to form the surface treatment 20, the surface treatment composition can be dispersed in a variety of solvents or carriers, such as water. Although water is the most preferred solvent or carrier, a variety of other solvents or carriers can be employed. The surface treatment 20 can also include numerous fillers, including, for example: air-floated, water-washed, or calcinated kaolin clay; precipitated or dry ground calcium carbonate or limestone; or silicates, such as mica, glass, ceramic microspheres, feldspar, or nepheline syenite. In addition, the surface treatment 20 can include diatomaceous earth, talc, gypsum calcite, or zinc oxide. The fillers are desirably, added, for example, to adjust the color, rheology and hiding power or opacity of the surface treatment.

In addition, $TiO_2$ can be added to the surface treatment 20 to provide brightness and opacity. The surface treatment 20 can also include: a dispersant, for dispersing the various solids and to keep them from agglomerating; a thickener, for paint holdout and for developing application viscosity; a surfactant; and a defoamer, for minimizing air entrainment. The dispersant, thickener, surfactant, filler, and defoamer are selected so as not to emit or generate formaldehyde.

A variety of dispersants, thickeners, surfactants, and defoamers can be employed in the surface treatment of the formaldehyde-free acoustic tile of the present invention. Suitable dispersants include tetra potassium pyrophosphate (TKPP) (FMC Corp.) and the sodium salt of polycarboxylate, available as Tamol® 731A (Rohm & Haas). An example of a thickener is hydroxyethyl cellulose, available as Natrosol® (Hercules, Inc.). An illustrative surfactant is ethoxylated nonylphenol, available as IGEPAL® CO-630 (Rhodia Canada, Inc.). An exemplary defoamer is an oil based defoamer, available as Hi-Mar DFC-19 (Hi-Mar Specialties, Inc.). As those skilled in the art will appreciate, the surface treatment composition can comprise one or more of each of the dispersant, thickener, surfactant, filler, and defoamer.

A variety of formulations of surface treatment can be employed. In one embodiment, the formulation of the surface treatment 20 comprises from about 30 to about 50 weight % water, from about 40 to about 60 weight % filler, from about 2 to about 15 weight % $TiO_2$, from about 2 to about 20 weight % latex, from about 0.25 to about 1.00 weight % dispersant, from about 0.01 to about 1.00 weight % thickener, from about 0.05 to about 0.50 weight % defoamer, from about 0.1 to about 1.0 weight % surfactant, and from about 0.01 to about 1.50 weight % biocide. More preferably, the formulation of the surface treatment 20 comprises from about 35 to about 40 weight % water, from about 45 to about 55 weight % filler, from about 2 to about 5 weight % $TiO_2$, from about 3 to about 8 weight % latex, from about 0.50 to about 1.00 weight % dispersant, from about 0.01 to about 0.15 weight % thickener, from about 0.05 to about 0.20 weight % defoamer, from about 0.1 to about 0.5 weight % surfactant, and from about 0.01 to about 1.10 weight % biocide. Even more preferably, the formulation of the surface treatment 20 comprises from about 35 to about 38 weight % water, from about 52 to about 57 weight % filler, from about 2.50 to about 3.75 weight % $TiO_2$, from about 5 to about 8 weight % latex, from about 0.75 to about 1.00 weight % dispersant, from about 0.05 to about 0.10 weight % thickener, from about 0.10 to about 0.15 weight % defoamer, from about 0.20 to about 0.50 weight % surfactant, and from about 0.025 to about 0.60 weight % biocide.

In another aspect, the present invention provides a process of manufacturing a formaldehyde-free acoustical tile. The method comprises preparing the acoustical tile core 10 and applying the surface treatment composition to the core 10 to form the surface treatment 20. The surface treatment composition and surface treatment 20 comprise a formaldehyde-free latex binder and one or more formaldehyde-free biocides.

The following examples further illustrate the invention but, of course, should not be construed as in any way limiting its scope.

Example 1

In this example a number of acoustical tiles were produced and tested for formaldehyde emission in accordance with the Standard Practice. The results are provided in Examples 1-7. Examples 1 and 2 provide formaldehyde emission data for two standard acoustical tiles. Example 3 provides formaldehyde emission data for an acoustical tile that comprises a core and a fire resistant back coating. Example 4 provides formaldehyde emission data for an acoustical tile of the present invention that comprises a core, a fire resistant back coating, and a surface treatment comprising a formaldehyde-free latex, wherein the formaldehyde-free latex includes a formaldehyde-free biocide. Example 5 provides formaldehyde emission data for an acoustical tile of the present invention as described in Example 4, except that the acoustical tile of Example 5 also includes an additional biocide that was added to the surface treatment composition. Examples 6 and 7 provide formaldehyde emission data for acoustical tiles of the present invention that comprise a core, a fire resistant back coating, and a surface treatment comprising a formaldehyde-free latex and a formaldehyde-free biocide.

TABLE 1

Quantification of Formaldehyde Emission

| Example | Description | Chamber Concentration ($\mu g/m^3$) |
|---|---|---|
| (1)[a,b,c,d] | Cast Acoustical Ceiling Panel | 3.7 |
| (2)[a,b+,c,d] | Cast Acoustical Ceiling Panel | 3.2 |
| (3)[a,b+] | Core w/:<br>(1) Fire resistant back coating | Below the lower LOQ |
| (4)[a,b+,e,f] | Core w/:<br>(1) Fire resistant back coating;<br>(2) A surface treatment including:<br>(a) a formaldehyde-free latex | Below the lower LOQ |
| (5)[a,b+,e,g] | Core w/:<br>(1) Fire resistant back coating;<br>(2) A surface treatment including:<br>(a) a formaldehyde-free latex;<br>(b) a formaldehyde-free biocide | Below the lower LOQ |
| (6)[a,b,e,g] | Frost ™ ClimaPlus ™ (Acoustone ®) | Below the lower LOQ |
| (7)[a,b,e,g] | Summit ™ ClimaPlus ™ (Acoustone ®) | Below the lower LOQ |

[a]The core includes rock wool, starch, stucco, boric acid, and SHMP, and is made by a cast process (Frost Acoustone ®)
[b]The fire resistant back coating includes water and a flame retardant (available as Pyrobreak ™ EX 18-USG).
[b+]The fire resistant back coating includes water, a flame retardant (available as Pyrobreak ™ EX 18-USG), and a biocide (available as Zinc Omadine ® emulsion).
[c]The latex used in this example is a vinyl acrylic co-polymer, available as HP 31-316.
[d]The biocide used in this example is a combination of Metasol ® D3T and Metasol ® TK100.
[e]The formaldehyde-free latex employed in this example is a vinyl acrylic co-polymer, available as HP 31-316 NF. This formaldehyde-free latex includes 1,2-benzisothiazolin-3-one, supplied as Proxel ® GXL (ARCH Chemicals), as manufactured.
[f]No additional biocide was added to the surface treatment composition used in this example, other than that included in the formaldehyde-free latex.
[g]The formaldehyde-free biocide employed in this example is a combination of 1,2-benzisothiazolin-3-one and methyl-4-isothiazolin-3-one, available as Acticide ® MBS (Acti-Chem).

The results shown in Example 3 demonstrate that the combination of the fire resistant back coating and the core is formaldehyde-free as defined herein, that is, the acoustical tile of this example emits less than 2 $\mu g/m^3$, which is below the lower LOQ of the Standard Practice. Example 4 demonstrates that the acoustic tile, which includes the fire resistant back coating, formaldehyde-free latex, and the core, is formaldehyde-free as defined herein. Examples 5, 6 and 7 demonstrate that acoustic tiles, which, among other things, include formaldehyde-free biocide as a component of the surface treatment, are also formaldehyde-free as defined herein. Further, Examples 3-7 in Table 1 demonstrate that the combination of components as used to make acoustic tile of the present invention are also formaldehyde-free as defined herein. Examples 3-7 are also illustrative of the preferred embodiment of the invention, in that the formaldehyde emission of these tiles is below about 1 $\mu g/m^3$.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An acoustical tile comprising a core and a surface treatment, wherein the surface treatment comprises a surface treatment composition that is applied to the core, and wherein the surface treatment composition prior to drying comprises:

from about 30 to about 50 weight % solvent;

from about 40 to about 60 weight % filler;

from about 2 to about 15 weight % $TiO_2$;

from about 2 to about 20 weight % formaldehyde-free and non-formaldehyde-emitting latex;

from about 0.25 to about 1.00 weight % dispersant;

from about 0.01 to about 1.00 weight % formaldehyde-free and non-formaldehyde-emitting thickener, wherein the formaldehyde-free and non-formaldehyde-emitting thickener is *a material* selected from the group consisting of methyl cellulose, [methylhydroxycellulose] *methylhydroxyethylcellulose*, methylhydroxypropylcellulose, hydroxypropyl cellulose, sodium carboxymethylcellulose, hydroxyethylcellulose, and soy-protein derived polymers, or combinations thereof;

from about 0.10 to about 1.00 weight % surfactant;

from about 0.05 to about 0.50 weight % defoamer; and from about 0.01 to about 1.50 weight % formaldehyde-free and non-formaldehyde-emitting biocide, and wherein the acoustical tile is formaldehyde-free and does not emit formaldehyde.

2. The acoustical tile of claim 1, wherein the biocide is an isothiazolin-3-one.

3. The acoustical tile of claim 1, wherein the biocide is a combination of 1,2-benzisothiazolin-3-one and methyl-4-isothiazolin-3-one.

4. The acoustical tile of claim 1, wherein the core comprises a fiber selected from the group consisting of a glass fiber, a mineral wool fiber and mixtures thereof, wherein the mineral wool fiber is selected from the group consisting of slag wool, rock wool, basalt wool, and mixtures thereof, wherein the core further comprises a member selected from the group consisting of a calcium sulfate material, boric acid, kaolin clay, guar gum, sodium hexametaphosphate, and mixtures thereof, the tile comprises a backing selected from the group consisting of bleached paper, unbleached paper, and kraft/aluminum foil.

5. The acoustical tile of claim 1 further comprising zinc 1-hydroxy-2(1H)-pyridinethione.

6. The acoustical tile of claim 1, wherein the tile has a formaldehyde release or emission that is below a quantifiable limit of about 1 $\mu g/m^3$.

*7. The acoustical tile of claim 1, wherein the core is formed of a mineral wool fiber.*

*8. The acoustical tile of claim 1, wherein the tile has a formaldehyde-free and non-formaldehyde-emitting fire resistant back coating.*

*9. A formaldehyde-free acoustical tile consisting essentially of a core and a surface treatment, wherein the surface treatment comprises a surface treatment composition that is applied to the core:*

*wherein the surface treatment has a formaldehyde release or emission that is below a quantifiable limit of 1 $\mu g/m^3$ and the surface treatment composition prior to drying comprises:*

*from about 30 to about 50 weight % solvent;*

*from about 40 to about 60 weight % filler;*

*from about 2 to about 15 weight % $TiO_2$;*

*from about 2 to about 20 weight % latex that has a formaldehyde release or emission that is below a quantifiable limit of 1 $\mu g/m^3$;*

*from about 0.25 to about 1.00 weight % dispersant;*

*from about 0.01 to about 1.00 weight % thickener that has a formaldehyde release or emission that is below a quantifiable limit of 1 $\mu g/m^3$ and comprises a material selected from the group consisting of methyl cellulose, methylhydroxyethylcellulose, methylhydroxypropylcellulose, hydroxypropyl cellulose, sodium carboxymethylcellulose, hydroxyethylcellulose, and soy-protein derived polymers, or combinations thereof;*

*from about 0.10 to about 1.00 weight % surfactant;*

*from about 0.05 to about 0.50 weight % defoamer; and*

*from about 0.01 to about 1.50 weight % biocide that has a formaldehyde release or emission that is below a quantifiable limit of 1 $\mu g/m^3$ and is selected from the group consisting of 1,2,-benzisothiazolin-3-one, blends of 1,2,-benzisothiazolin-3-one and 2-methyl-4-isothiazolin-3-one, 5-chloro-2-methyl-4-isothiazolin-3-one, blends of 5-chloro-2-methyl-4-isothiazolin-3-one and 2-methyl-4-isothiazolin-3-one, zinc 1-hydroxy-2(1H)-pyridinethione, blends of zinc 1-hydroxy-2(1H)-pyridinethione and zinc oxide, and 2-n-octyl-4-isothiazolin-3-one; and*

*wherein the core comprises a fiber selected from the group consisting of glass fiber, mineral wool fiber and mixtures thereof, wherein the mineral wool fiber is selected from the group consisting of slag wool, rock wool, basalt wool, and mixtures thereof, wherein the core further comprises a member selected from the group consisting of a calcium sulfate material, boric acid, kaolin clay, guar gum, sodium hexametaphosphate, and mixtures thereof; and*

*wherein the acoustical tile has a formaldehyde release or emission that is below a quantifiable limit of 1 $\mu g/m^3$.*

*10. The acoustical tile of claim 9, wherein the core is formed of a mineral wool fiber.*

*11. The acoustical tile of claim 9, wherein the tile has a fire resistant back coating having a formaldehyde release or emission that is below a quantifiable limit of 1 $\mu g/m^3$.*

* * * * *